United States Patent
Hou

(10) Patent No.: US 10,102,816 B2
(45) Date of Patent: Oct. 16, 2018

(54) METHOD AND APPARATUS FOR COMPENSATING DATA VOLTAGE AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Shuai Hou, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 298 days.

(21) Appl. No.: 14/785,319

(22) PCT Filed: Apr. 2, 2015

(86) PCT No.: PCT/CN2015/075775
§ 371 (c)(1),
(2) Date: Oct. 16, 2015

(87) PCT Pub. No.: WO2016/074420
PCT Pub. Date: May 19, 2016

(65) Prior Publication Data
US 2016/0372066 A1    Dec. 22, 2016

(30) Foreign Application Priority Data
Nov. 13, 2014   (CN) .......................... 2014 1 0640673

(51) Int. Cl.
*G09G 3/36*   (2006.01)
*G02F 1/133*  (2006.01)

(52) U.S. Cl.
CPC ........... *G09G 3/3648* (2013.01); *G02F 1/133* (2013.01); *G09G 2300/0426* (2013.01);
(Continued)

(58) Field of Classification Search
CPC .. G09G 3/2018; G09G 3/2011; G09G 3/3611; G09G 2300/08; G09G 2310/02;
(Continued)

(56) References Cited

U.S. PATENT DOCUMENTS 5,798,740 A * 8/1998 Bitzakidis ............ G09G 3/3648
345/58
5,940,057 A   8/1999 Lien et al.
(Continued)

FOREIGN PATENT DOCUMENTS

CN   1310434 A   8/2001
CN   1407529 A   4/2003
(Continued)

OTHER PUBLICATIONS

International Search Report and Written Opinion, dated Jul. 30, 2015 for Corresponding PCT Application No. PCT/CN2015/075775.
(Continued)

*Primary Examiner* — Nalini Mummalaneni
(74) *Attorney, Agent, or Firm* — Kinney & Lange, P.A.

(57) ABSTRACT

The embodiment of the present invention provides methods and apparatus for compensating data voltage and display devices and relates to a display field, which are capable of decreasing leakage currents of thin film transistors and improving or eliminating the vertical crosstalk phenomenon. The method for compensating data voltage, comprising the following steps of: determining whether a current frame is identical to a previous one frame; outputting a compensation voltage to compensate data voltage of the current frame if the current frame is identical to that previous one frame; and outputting information about the frame according to the compensated data voltage.

18 Claims, 3 Drawing Sheets

(52) U.S. Cl.
CPC ... *G09G 2310/027* (2013.01); *G09G 2310/06* (2013.01); *G09G 2320/0214* (2013.01); *G09G 2320/103* (2013.01)

(58) Field of Classification Search
CPC ......... G09G 2310/027; G09G 2310/04; G09G 2310/063; G09G 2310/068; G09G 2310/08; G09G 2310/0286; G09G 2310/061; G09G 2310/0254; G09G 2310/06; G09G 2320/0247; G09G 2320/0285; G09G 2320/0204; G09G 2320/0673; G09G 2320/0261; G09G 2320/0276; G09G 2320/0271; G09G 2320/103; G09G 2320/04; G09G 2320/021; G09G 2320/043; G09G 2340/16; G09G 2360/16; G09G 2360/18
See application file for complete search history.

(56) References Cited

U.S. PATENT DOCUMENTS

| | | |
|---|---|---|
| 2002/0067324 A1 | 6/2002 | Aoki |
| 2004/0179002 A1* | 9/2004 | Park ............... G09G 3/3611 345/204 |
| 2007/0040797 A1* | 2/2007 | Shih ............... G09G 3/3406 345/102 |
| 2007/0146281 A1 | 6/2007 | Hosihara et al. |
| 2008/0106544 A1* | 5/2008 | Lee ............... G09G 3/3611 345/214 |
| 2010/0045583 A1 | 3/2010 | Park et al. |
| 2010/0098349 A1* | 4/2010 | Arashima ............ G09G 3/3648 382/263 |
| 2011/0148846 A1* | 6/2011 | Arasawa ............... G09G 3/3614 345/212 |
| 2013/0155090 A1 | 6/2013 | Pourbigharaz et al. |
| 2014/0267213 A1 | 9/2014 | Wakabayashi et al. |
| 2014/0267452 A1 | 9/2014 | Wakabayashi et al. |

FOREIGN PATENT DOCUMENTS

| | | |
|---|---|---|
| CN | 101303491 A | 11/2008 |
| CN | 101425266 A | 5/2009 |
| CN | 103065594 A | 4/2013 |
| CN | 103257498 A | 8/2013 |
| CN | 103988148 A | 8/2014 |
| CN | 104317085 A | 1/2015 |
| KR | 20100022786 A | 3/2010 |

OTHER PUBLICATIONS

First Chinese Office Action (including English translation) dated Aug. 18, 2016, for corresponding Chinese Application No. 201410640673.3.

Extended European Search Report dated Jul. 4, 2018, for corresponding European Application No. 15777853.1.

* cited by examiner

METHOD AND APPARATUS FOR COMPENSATING DATA VOLTAGE AND DISPLAY DEVICE

CROSS-REFERENCE TO RELATED APPLICATION(S)

The present application is the national phase of PCT Application No. PCT/CN2015/075775 filed on Apr. 2, 2015 entitled "METHOD AND APPARATUS FOR COMPENSATING DATA VOLTAGE AND DISPLAY DEVICE", which in turn claims priority to a Chinese patent application No. 201410640673.3, filed on Nov. 13, 2014 and entitled "METHOD AND APPARATUS FOR COMPENSATING DATA VOLTAGE AND DISPLAY DEVICE", which are incorporated herein by reference in their entirety.

TECHNICAL FIELD

The present disclosure relates to a display field, especially to methods and apparatus for compensating data voltage and display devices.

BACKGROUND

A Liquid Crystal Display comprises an array substrate and a color film substrate. Gate lines and data lines are interlaced horizontally and vertically on the array substrate, and the gate lines and the data lines surround pixel units. A thin film transistor and pixel electrodes are provided within each of the pixel units. The thin film transistor comprises a gate electrode, a source electrode and a drain electrode, wherein the gate electrode is connected to the gate line, the source electrode is connected to the data line and the drain electrode is connected to the pixel electrode.

During a displaying procedure of the Liquid Crystal display, the gate lines are non-interlaced scanned, so that one gate line controls one line of thin film transistors, then controls one line of pixel electrodes. When one gate line is scanned, the thin film transistors controlled by such a gate line are turned on so as to transfer a corresponding data voltage at the data line to the pixel electrodes to charge the pixel electrode; and after the scanning is ended, the thin film transistors are turned off. However, when the thin film transistors are turned off, there are leakage currents inside the thin film transistors. The leakage currents decrease pixel voltages at the pixel electrodes, so an absolute value of a voltage difference between the pixel voltage and a voltage at a common electrode on the color film substrate, and then the displaying effect of the pixel units may be influenced. The larger the pixel voltage is, the larger the voltage difference between the data voltage at the data line and the pixel voltage is, and the larger the leakage current of the thin film transistor is.

Furthermore, when the Liquid Crystal Display displays a static frame, an extremely larger leakage current of the thin film transistor may affect the data voltage at the data line to which the thin film transistor is connected, and in turn affect pixel voltages at other pixel electrodes on the data line. Thus, a vertical crosstalk phenomenon is generated.

SUMMARY

The technical problem to be solved by the present invention is to provide methods and apparatus for compensating data voltage and display devices, which are capable of decreasing leakage currents of thin film transistors and improving or eliminating the vertical crosstalk phenomenon.

In order to solve the technical problem as mentioned above, an embodiment of the present invention provides a method for compensating data voltage which utilizes the following technical solution.

The method for compensating data voltage comprises the following steps of: determining whether a current frame is identical to a previous one frame; outputting a compensation voltage to compensate data voltage of the current frame if the current frame is identical to that previous one frame; and outputting information about the frame according to the compensated data voltage.

Preferably, the compensation voltage is adjusted by an amount of the leakage current of a thin film transistor and a collected crosstalk value of a display panel after compensation, so that the crosstalk of the compensated data voltage is minimal.

Preferably, the data voltage is compensated by increasing or decreases the data voltage with an amount of the compensation voltage.

Preferably, the step of determining whether the current frame is identical to the previous one frame comprises steps of: determining whether a gray level of each of the pixel units in the current frame is identical to that of the corresponding pixel units in the previous one frame; and determining that the current frame is identical to that of the previous one frame if they are identical to each other.

The step of determining whether the gray level of each of the pixel units in the current frame is identical to that of the corresponding pixel units in the previous one frame comprises steps of: determining whether an absolute value of a voltage difference between pixel electrodes and the common electrode for each of the pixel units in the current frame and for the corresponding pixel units in the previous one frame; and determining that the current frame is identical to that of the previous one frame if they are identical to each other.

The step of outputting the compensation voltage to compensate the data voltage comprises steps of: outputting compensation voltages corresponding to each of the pixel units in the current frame to compensate data voltages of all the pixel units in the current frame.

The step of outputting compensation voltages to compensate data voltages in the current frame comprises steps of: calculating a difference value of a maximal gray level and a minimal gray level of all the pixel units connected to the same data line; judging whether the difference value is larger than a critical value; and if the difference value is larger than the critical value, outputting compensation voltages corresponding to all the pixel units connected to the data line to compensate the data voltages of all the pixels connected to the data line.

The step of outputting compensation voltages to compensate data voltages in the current frame comprises steps of: calculating a difference value of a maximal gray level and a minimal gray level of all the pixel units connected to the same data line; judging whether the difference value is larger than a critical value; and if the difference value is larger than the critical value, outputting compensation voltages corresponding to the pixel units connected to the data line except the pixel units with the minimal gray level to compensate the data voltages of the pixels connected to the data line except the pixel unit with the minimal gray level.

The step of calculating the difference value of a maximal gray level and a minimal gray level of all the pixel units connected to the same data line comprises steps of: determining gray levels of all the pixel units according to the absolute value of the voltage difference between the common electrode and the pixel electrodes in all the pixels units connected to the same data line; and calculating difference values between the maximal gray level and the minimal gray level.

The magnitude of the compensation voltage corresponding to each of the pixel units is set according to the amount of the leakage current of the thin film transistor contained in the pixel unit. The larger the leakage current of the thin film transistor is, the larger the compensation voltage corresponding to the pixel units is.

The embodiment of the present invention provides a method for compensating data voltage comprising the following steps of: determining whether a current frame is identical to a previous one frame; if the current frame is identical to that previous one frame, outputting a compensation voltage to compensate data voltage of the current frame; and outputting information about the frame according to the compensated data voltage. Since the output compensation voltage compensates the data voltage, the voltage difference between the data voltage and the pixel voltage may be effectively reduced and the leakage current of the thin film transistor may be decreased. Then, the influence of the leakage current of the thin film transistor on the pixel voltage at other pixel electros on the data line may be reduced, and finally the vertical crosstalk phenomenon may be improved or eliminated.

Furthermore, an embodiment of the present invention provides an apparatus for compensating data voltage by utilizing the method for compensating data voltage as mentioned above. The apparatus for compensating data voltage comprises a judging module, a time sequence controlling module and an outputting module. The judging module is configured to determine whether a current frame is identical to a previous one frame. The time sequence controlling module is configured to output a compensation voltage to compensate data voltage of the current frame. The outputting module is configured to output information about the frame according to the compensated data voltage.

The embodiment of the present invention provides an apparatus for compensating data voltage comprising the judging module, the time sequence controlling module and the outputting module. The judging module is configured to determine whether a current frame is identical to a previous one frame. The time sequence controlling module is configured to output a compensation voltage to compensate data voltage of the current frame. The outputting module is configured to output information about the frame according to the compensated data voltage. Since the time sequence controlling module outputs the compensation voltage to compensate data voltage, the voltage difference between the data voltage and the pixel voltage may be effectively reduced and the leakage current of the thin film transistor may be decreased. Then, the influence of the leakage current of the thin film transistor on the pixel voltage at other pixel electros on the data line may be reduced, and finally the vertical crosstalk phenomenon may be improved or eliminated.

Furthermore, an embodiment of the present invention further provides a display device comprising the apparatus for compensating data voltage as mentioned above.

BRIEF DESCRIPTION OF THE DRAWINGS

In order to definitely illustrate technical solutions of embodiments of the present invention or the prior art, accompany figures used in the embodiments would be simply introduced. It is obvious that the accompany figures only show some embodiments of the present invention, and it is appreciated for those skilled in the art to obtain other figures based on these accompany figures without any inventive labors.

DETAILED DESCRIPTION

The preferable embodiments of the present invention would be illustrated in detail by referring to the accompany figures. Unnecessary details and functions are omitted so as not to confuse understanding of the present invention.

The technical solutions of the embodiments of the present invention will be clearly and completely illustrated in conjunction with the accompany figures. It is obvious that the illustrated embodiments are not all the embodiments, but only some partials of the embodiments of the present invention. Those skilled in the art may obtain all the other embodiments based on the embodiments of the present invention without any inventive labors, which also fall within the scope of the present invention.

An embodiment of the present invention provides a method for compensating data voltage, which may decrease the leakage current of the thin film transistor and finally improve or eliminate the vertical crosstalk phenomenon.

Figure 1:
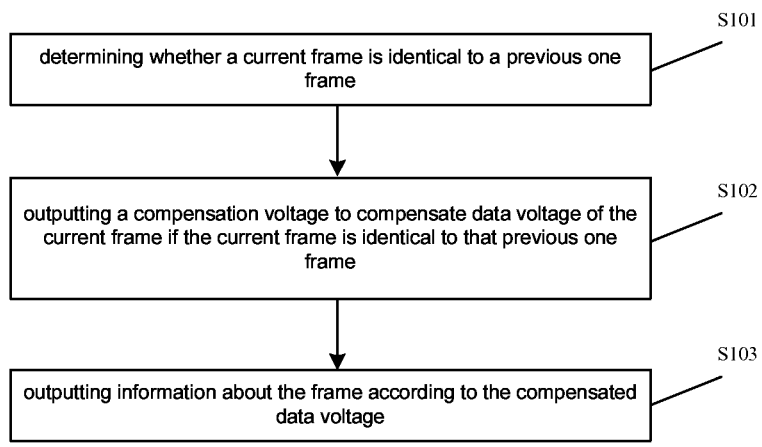
FIG. 1 shows a flowchart of a method compensating data voltage according to an embodiment of the present invention.

As shown in FIG. 1, the method for compensating data voltage comprises the following steps.

At step S101, it is determined whether a current frame is identical to a previous one frame.

In particularly, it is determined whether a gray level of each of the pixel units in the current frame is identical to that of the corresponding pixel units in the previous one frame; and when they are identical to each other, it is determined that the current frame is identical to that of the previous one frame. Furthermore, it is determined whether an absolute value of a voltage difference between pixel electrodes and the common electrode for each of the pixel units in the current frame and for the corresponding pixel units in the previous one frame; and when they are identical to each other, the gray level of each of the pixel units for the current frame is identical to that of the corresponding pixel unit for the previous one frame, so it is determined that the current frame is identical to that of the previous one frame.

At step S102, if the current frame is identical to that previous one frame, a compensation voltage is output to compensate data voltage of the current frame; and if the current frame is not identical to the previous frame, it is not serious for the vertical crosstalk phenomenon, so it is not necessary to compensate the data voltage.

At step S103, information about the frame is output according to the compensated data voltage.

It should be noted that in the method for compensating data voltage as mentioned above, the magnitude of the compensation voltage corresponding to each of the pixel units may be set according to the amount of the leakage current of the thin film transistor contained in the pixel unit. The larger the leakage current of the thin film transistor is, the larger the compensation voltage corresponding to the pixel units is.

As mentioned above, it may be determined whether the frame is a static frame by comparing difference between two frames output by the display panel. If the two frames are identical, it is a static frame that is displayed in the display panel, so it is necessary to compensate the frame. In particular, the compensation may be done for selected output data values on one data line, and the compensation may be done for all the data. If the different data values on the same data line are compensated, the compensated value should be larger than the data values on the same data line.

The magnitude of a particular compensation value may be set according to a size of an actual leakage current of the display panel. The data voltage output by the system may be adjusted according to a characteristic of the actual display panel.

In particular, the compensation voltage may be adjusted by an amount of the leakage current and a collected crosstalk value of a display panel after compensation, so that the crosstalk of the compensated data voltage is minimal. The compensation voltage may be adjusted according to the compensated crosstalk value so that the crosstalk of the compensated data voltage is minimal. That is to say, the compensation voltage may be adjusted by feedback of the crosstalk value. In particular, the data voltage may be compensated by increasing or decreases the data voltage with an amount of the compensation voltage. That is to say, the compensation voltage may be positive or negative value. Furthermore, the embodiments of the present invention provide three particular implementations to compensate data voltage of the current frame by outputting the compensation voltage as follows.

In the first option, a compensation voltage corresponding to each of the pixel units for the current frame is output to compensate data voltages of all the pixel units for the current frame.

In the second option, a difference value of a maximal gray level and a minimal gray level of all the pixel units connected to the same data line is calculated; and it is judged whether the difference value is larger than a critical value; and if the difference value is larger than the critical value, compensation voltages corresponding to all the pixel units connected to the data line are output to compensate the data voltages of all the pixels connected to the data line. If the difference value is smaller than or equal to the critical value, it is not serious for the vertical crosstalk phenomenon and the embodiment of the present invention may do not compensate the data voltages. The magnitude of the critical value as mentioned may be set according to a displaying effect when the vertical crosstalk occurs in the prior art, or the pixel units may be firstly compensated in experiments, an improved situation of the displaying effect may be observed, and then the critical values may be determined. The embodiments of the present invention do not limit particular values of the critical values.

In the third option, a difference value of a maximal gray level and a minimal gray level of all the pixel units connected to the same data line is calculated, and it is judged whether the difference value is larger than a critical value. If the difference value is larger than the critical value, outputting compensation voltages corresponding to the pixel units connected to the data line except the pixel units with the minimal gray level is output to compensate the data voltages of the pixels connected to the data line except the pixel unit with the minimal gray level. If the difference value is smaller than or equal to the critical value, it is not serious for the vertical crosstalk phenomenon and the embodiment of the present invention may do not compensate the data voltages. The magnitude of the critical value as mentioned may be set according to a displaying effect when the vertical crosstalk occurs in the prior art, or the pixel units may be firstly compensated in experiments, an improved situation of the displaying effect may be observed, and then the critical values may be determined. The embodiments of the present invention do not limit particular values of the critical values.

Furthermore, in the second and third options, the step of calculating the difference value of a maximal gray level and a minimal gray level of all the pixel units connected to the same data line comprises steps of: determining gray levels of all the pixel units according to the absolute value of the voltage difference between the common electrode and the pixel electrodes in all the pixels units connected to the same data line; and calculating difference values between the maximal gray level and the minimal gray level.

It should be noted that the particular implementation for outputting the compensation voltage to compensate the data voltage is not limited to the three options as mentioned above, and may be provided by those skilled in the art based on actual situations, which is not limited by the embodiment of the present invention.

Figure 2:
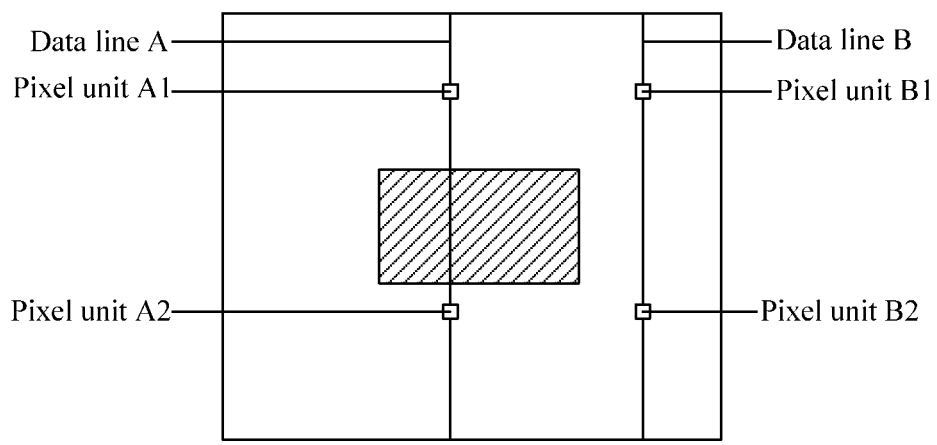
FIG. 2 shows a schematic view of the current frame according to the embodiment of the present invention.
Figure 3:
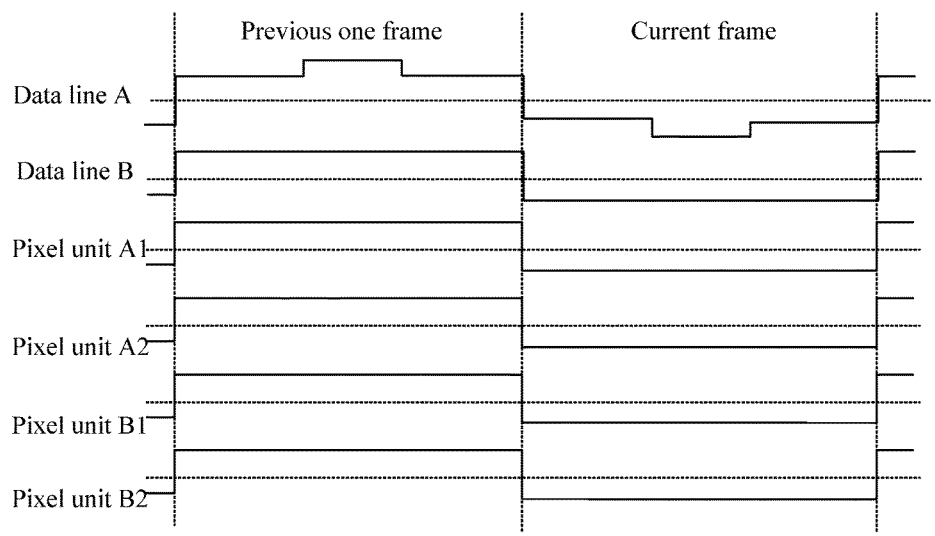
FIG. 3 shows waveforms of the data voltage on data line A and data line B and waveforms of the pixel voltages on the pixel units A1, A2, B1 and B2 in an ideal state.
Figure 4:
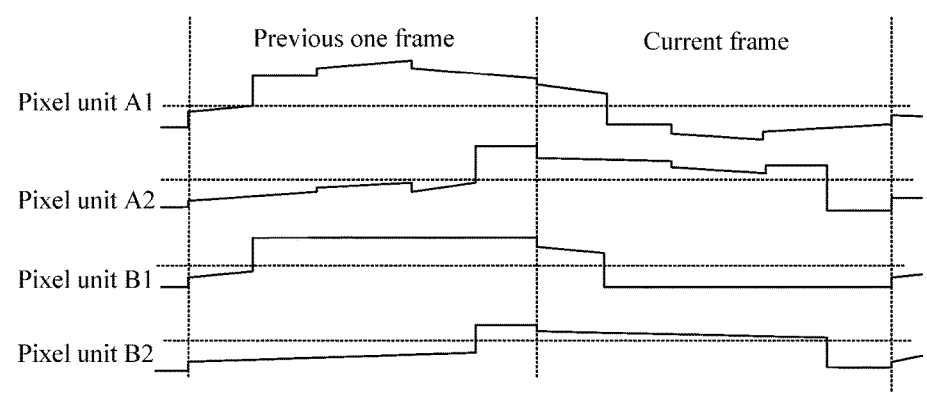
FIG. 4 shows waveforms of the pixel voltages on the pixel units A1, A2, B1 and B2 according to the prior art.
Figure 5:
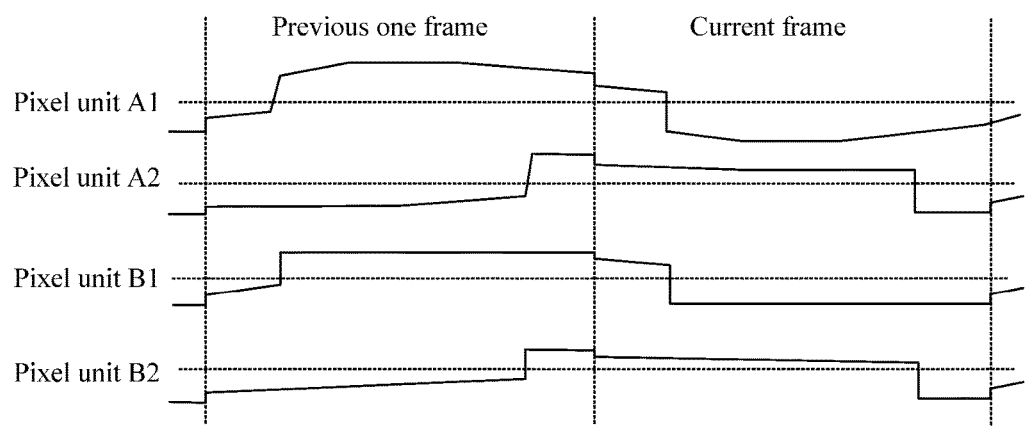
FIG. 5 shows waveforms of the pixel voltages on the pixel units A1, A2, B1 and B2 according to the embodiment of the present invention.

Exemplarily, when the previous one frame is identical to the current frame and the pixel units in the frame only have gray levels L0 and L127, as shown in FIG. 2, the middle shaded portion represents the pixel units with a gray level of L0 and other portions represent pixel units with a gray level of L127. The pixel units A1 and A2 are two pixel units with a gray level of L127 and connected by the data line A, and the pixel units B1 and B2 are two pixel units with a gray level of L127 and connected by the data line B. In an ideal state without considering the leakage current of the thin film transistor, waveforms of the data voltage on data line A and data line B and waveforms of the pixel voltages on the pixel units A1, A2, B1 and B2 in an ideal state are shown in FIG. 3, and it shows that the pixel voltages on the pixel units A1, A2, B1 and B2 in one frame are fixed values. In the prior art, since the thin film transistors has a leakage current, waveforms of the pixel voltages on the pixel units A1, A2, B1 and B2 are shown in FIG. 5, and it shows that the pixel voltages on the pixel units A1, A2, B1 and B2 in one frame are fluctuated seriously, which leads to a serious vertical crosstalk phenomenon.

For the data line A, the pixel units connected to the data line A comprises pixel units with a gray level of L0 and pixel units with a gray level of L127. The leakage current of the thin film transistor within the pixel units with the gray level of L0 is larger, which greatly affects the data voltage on the pixel units with the gray level of L127 so that the vertical crosstalk phenomenon among the pixel units connected to the data line A is serious. For the data line B, the pixel units connected to the data line B are all pixel units with the gray level of L227, so the vertical crosstalk phenomenon is weak.

Thus, during the procedure of compensating the data voltages, only the data voltages of the pixel units with the gray level of L127 and connected to the data line A may be compensated, the data voltage of all of the pixel units connected to the data line A may be compensated, or the data voltage of all of the pixel units connected to the data line A and all of the pixel units connected to the data line B may be compensated. Exemplarily, when the method for compensating data voltage according to the embodiment of the present invention is utilized to compensate the data voltages, the waveforms of the pixel voltages on the pixel units A1, A2, B1 and B2 are shown in FIG. 5, and it shows that the pixel voltages on the pixel units A1, A2, B1 and B2 in one frame are fluctuated smoothly, so that the vertical crosstalk phenomenon is improved or eliminated.

The present invention provides a method for compensating data voltage comprising the following steps of: determining whether a current frame is identical to a previous one frame; if the current frame is identical to that previous one frame, outputting a compensation voltage to compensate data voltage; and outputting information about the frame. Since the output compensation voltage compensates the data voltage, the voltage difference between the data voltage and the pixel voltage may be effectively reduced and the leakage current of the thin film transistor may be decreased. Then, the influence of the leakage current of the thin film transistor on the pixel voltage at other pixel electros on the data line may be reduced, and finally the vertical crosstalk phenomenon may be improved or eliminated.

The embodiment of the present invention further provides an apparatus for compensating data voltage by utilizing the method for compensating data voltage as mentioned above. In particular, the apparatus for compensating data voltage comprises a judging module, a time sequence controlling module and an outputting module. The judging module is configured to determine whether a current frame is identical to a previous one frame. The time sequence controlling module is configured to output a compensation voltage to compensate data voltage of the current frame. The outputting module is configured to output information about the frame according to the compensated data voltage. The time sequence controlling modules of the embodiment of the present invention comprises a time sequence controller.

Since the time sequence controlling module outputs the compensation voltage to compensate data voltage, the voltage difference between the data voltage and the pixel voltage may be effectively reduced and the leakage current of the thin film transistor may be decreased. Then, the influence of the leakage current of the thin film transistor on the pixel voltage at other pixel electros on the data line may be reduced, and finally the vertical crosstalk phenomenon may be improved or eliminated.

Furthermore, an embodiment of the present invention further provides a display device comprising the apparatus for compensating data voltage as mentioned above. The display apparatus may products or components having a displaying function, such as liquid crystal display, electronic paper, mobile phone, tablet computer, television, display, notebook, digital frame, navigator and the like.

By the descriptions of the embodiments as mentioned above, it should be definitely understood by those skilled in the art that the present invention may be implemented by software and some necessary general purpose hardware, and it may be also implemented by the hardware. However, in most situations, the former one is preferable. Based on such an understanding, the portions of the present invention which substantially contributes to the prior art may embodied in form of a software product stored in a readable storage medium such as a floppy disk, a hard disk or optical disk in a computer and including some instructions enabling one computer (which may be a personal computer, server or a network device) to implement the methods of the respective embodiments of the present invention.

The above mentioned descriptions only show particular implementations of the present invention and the present invention is not limited to it. Any modifications or alternatives which are appreciated for those skilled in the art based on the contents disclosed by the present invention may fall within the scope of the present invention. Thus, the scope of the present invention is defined by the accompany claims.

I claim:

1. A method for compensating data voltage in a display device, comprising the following steps of:
   determining whether a current frame is identical to a previous one frame;
   outputting a compensation voltage to compensate data voltage of the current frame if the current frame is identical to that previous one frame, the step of outputting compensation voltages to compensate data voltages in the current frame further comprising steps of:
   calculating a difference value of a maximal gray level and a minimal gray
      level of all the pixel units connected to the same data line;
   judging whether the difference value is larger than a critical value; and if the difference value is larger than the critical value, outputting compensation voltages corresponding to all the pixel units connected to the data line to compensate the data voltages of all the pixels connected to the data line; and
   outputting information about the frame according to the compensated data voltage.

2. The method for compensating data voltage according to claim 1, wherein the compensation voltage is adjusted by an amount of the leakage current of a thin film transistor and a collected crosstalk value of a display panel after compensation, so that the crosstalk of the compensated data voltage is minimal.

3. The method for compensating data voltage according to claim 2, wherein the data voltage is compensated by increasing or decreasing the data voltage with an amount of the compensation voltage.

4. The method for compensating data voltage according to claim 1, wherein the step of determining whether the current frame is identical to the previous one frame comprises steps of:
   determining whether a gray level of each of the pixel units in the current frame is identical to that of the corresponding pixel units in the previous one frame; and
   determining that the current frame is identical to that of the previous one frame if they are identical to each other.

5. The method for compensating data voltage according to claim 4, wherein the step of determining whether the gray level of each of the pixel units in the current frame is identical to that of the corresponding pixel units in the previous one frame comprises steps of:
   determining whether an absolute value of a voltage difference between pixel electrodes and the common electrode for each of the pixel units in the current frame and for the corresponding pixel units in the previous one frame; and
   determining that the current frame is identical to that of the previous one frame if they are identical to each other.

6. The method for compensating data voltage according to claim 1, wherein the step of outputting the compensation voltage to compensate the data voltage comprises steps of:
   outputting compensation voltages corresponding to each of the pixel units in the current frame to compensate data voltages of all the pixel units in the current frame.

7. The method for compensating data voltage according to claim 1, wherein the step of calculating the difference value of a maximal gray level and a minimal gray level of all the pixel units connected to the same data line comprises steps of:
    determining gray levels of all the pixel units according to the absolute value of the voltage difference between the common electrode and the pixel electrodes in all the pixels units connected to the same data line; and
    calculating difference values between the maximal gray level and the minimal gray level.

8. The method for compensating data voltage according to claim 1, wherein the magnitude of the compensation voltage corresponding to each of the pixel units is set according to the amount of the leakage current of the thin film transistor contained in the pixel unit, and the larger the leakage current of the thin film transistor is, the larger the compensation voltage corresponding to the pixel units is.

9. A method for compensating data voltage in a display device, comprising:
    determining whether a current frame is identical lo a previous one frame:
    outputting a compensation voltage to compensate data voltage of the current frame if the current frame is identical to that previous one frame, wherein the step of outputting compensation voltages to compensate data voltages in the current frame comprises steps of:
    calculating a difference value of a maximal gray level and a minimal gray level of all the pixel units connected to the same data line;
    judging whether the difference value is larger than a critical value; and if the difference value is larger than the critical value, outputting compensation voltages corresponding to the pixel units connected to the data line except the pixel units with the minimal gray level to compensate the data voltages of the pixels connected lo the data line except the pixel unit with the minimal gray level, and
    outputting information about the frame according to the compensated data voltage.

10. The method for compensating data voltage according to claim 9, wherein the the step of calculating the difference value of a maximal gray level and a minimal gray level of all the pixel units connected to the same data line comprises steps of:
    determining gray levels of all the pixel units according to the absolute value of the voltage difference between the common electrode and the pixel electrodes in all the pixels units connected to the same data line; and
    calculating difference values between the maximal gray level and the minimal gray level.

11. An apparatus for compensating data voltage in a display device, wherein the apparatus for compensating data voltage comprises at least one processor and computer-readable memory encoded with instructions to control the at least one processor to:
    determine whether a current frame is identical to a previous one frame; when the current frame is identical to the previous one frame, calculate a difference value of a maximal gray level and a minimal gray level of all the pixel units connected to a same data line, judge whether the difference value is larger than a critical value; and if the difference value is larger then the critical value, and output compensation voltages corresponding to all the pixel units connected to the data line to compensate the data voltages of all the pixels connected to the data line; and
    output information about the frame according to the compensated data voltage.

12. A display device comprising the apparatus for compensating data voltage according to claim 11.

13. The apparatus for compensating data voltage according to claim 11, wherein the compensation voltage is adjusted by an amount of the leakage current of a thin film transistor and a collected crosstalk value of a display panel after compensation, so that the crosstalk of the compensated data voltage is minimal.

14. The apparatus for compensating data voltage according to claim 11, wherein the data voltage is compensated by increasing or decreasing the data voltage with an amount of the compensation voltage.

15. The apparatus for compensating data voltage according to claim 11, wherein the apparatus determines whether a gray level of each of the pixel units in the current frame is identical to that of the corresponding pixel units in the previous one frame; and if they are identical to each other, it is determined that the current frame is identical to that of the previous one frame.

16. The apparatus for compensating data voltage according to claim 11, wherein the instructions are further configured to determine whether an absolute value of a voltage difference between pixel electrodes and the common electrode for each of the pixel units in the current frame and for the corresponding pixel units in the previous one frame; and if they are identical to each other, it is determined that the current frame is identical to that of the previous one frame.

17. The apparatus for compensating data voltage according to claim 11, wherein the instructions are further configured to output compensation voltages corresponding to each of the pixel units in the current frame to compensate data voltages of all the pixel units in the current frame.

18. An apparatus for compensating data voltage in a display device, wherein the apparatus for compensating data voltage comprises at least one processor and computer-readable memory encoded with instructions to control the at least one processor to:
    determine whether a current frame is identical to a previous one frame; calculate a difference value of a maximal gray level and a minimal gray level of all the pixel units connected to a same data line and judge whether the difference value is larger than a critical value; and if the difference value is larger than the critical value, output compensation voltage corresponding to the pixel units connected to the data line except the pixel units with the minimal gray level to compensate the data voltage of the pixels connected to the data line except the pixel unit with the minimal gray level; and
    output information about the frame according to the compensated data voltage.

* * * * *

UNITED STATES PATENT AND TRADEMARK OFFICE
CERTIFICATE OF CORRECTION

PATENT NO. : 10,102,816 B2  
APPLICATION NO. : 14/785319  
DATED : October 16, 2018  
INVENTOR(S) : Shuai Hou Page 1 of 1

It is certified that error appears in the above-identified patent and that said Letters Patent is hereby corrected as shown below:

In the Claims

Column 9, Line 19 Claim 9:  
Delete "lo"  
Insert --to--

Column 9, Line 40 Claim 10:  
Delete "the the"  
Insert --the--

Column 10, Line 1 Claim 11:  
Delete "then"  
Insert --than--

Signed and Sealed this  
Eighteenth Day of June, 2019

Andrei Iancu  
*Director of the United States Patent and Trademark Office*